(12) United States Patent
Gomez et al.

(10) Patent No.: US 10,124,445 B2
(45) Date of Patent: Nov. 13, 2018

(54) HEAT CONTAINMENT APPARATUS

(75) Inventors: Fernando Gomez, Pasadena, TX (US); Jose Maltez, Houston, TX (US); Dale Oberhoff, Richmond, TX (US); Ronald Joy, Katy, TX (US); Clayton Ownby, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1410 days.

(21) Appl. No.: 13/352,523

(22) Filed: Jan. 18, 2012

(65) Prior Publication Data

US 2013/0180692 A1 Jul. 18, 2013

(51) Int. Cl.
*C21C 5/02* (2006.01)
*B29C 65/18* (2006.01)
*B23K 37/00* (2006.01)

(52) U.S. Cl.
CPC .................. B23K 37/006 (2013.01)

(58) Field of Classification Search
CPC . B22F 3/1025; C21C 5/02; C03B 5/10; C03B 5/06; C03B 5/0334; C03B 5/0272; C03B 2211/70; B29C 65/18
USPC ....... 432/120, 156, 158, 178, 184, 206, 247, 432/248, 250, 262, 264
See application file for complete search history.

(56) References Cited

U.S. PATENT DOCUMENTS

| | | | |
|---|---|---|---|
| 731,333 A * | 6/1903 | Barker | B21J 17/00 126/226 |
| 2,637,315 A * | 5/1953 | Staggs | A01K 11/005 126/229 |
| 2,729,872 A | 1/1956 | Peterson | |
| 3,112,919 A * | 12/1963 | Gunow | C21D 1/773 236/15 BB |
| 3,438,616 A | 4/1969 | Fanning, Jr. et al. | |
| 3,724,444 A * | 4/1973 | Varona | B23K 3/027 126/237 |
| 3,752,643 A * | 8/1973 | Robinson | F27B 17/02 432/120 |
| 3,807,944 A | 4/1974 | Kranjcich et al. | |
| 4,139,341 A * | 2/1979 | Pfaffenbauer | A61C 13/20 432/184 |
| 4,531,910 A * | 7/1985 | Geil | F27B 17/0016 432/120 |
| 4,591,683 A * | 5/1986 | Eke | H05B 6/6411 126/21 A |
| 4,692,593 A * | 9/1987 | Chiu | F27D 11/02 219/399 |
| 4,771,256 A | 9/1988 | Laskaris et al. | |
| 5,195,673 A * | 3/1993 | Irish | B23K 1/0012 228/18 |
| 5,378,144 A * | 1/1995 | Cress | F27B 17/02 432/120 |

(Continued)

Primary Examiner — Gregory A Wilson
(74) Attorney, Agent, or Firm — Alan Bryson; Tumey L.L.P.

(57) ABSTRACT

A heat containment apparatus may include a housing having an access gap, the housing being formed of an insulating material. Alternatively, a heat containment apparatus includes a housing being an expandable structure having an access gap, the housing including an insulating material. Heat containment apparatuses may be used in conjunction with performing high temperature operations and/or low temperature operations to at least portions of substrates contained therein.

11 Claims, 9 Drawing Sheets

(56) References Cited

U.S. PATENT DOCUMENTS

| | | | | |
|---|---|---|---|---|
| 5,685,288 A * | 11/1997 | Sibley | F24C 3/14 | 126/226 |
| 5,853,289 A | 12/1998 | Todd et al. | | |
| 6,033,213 A * | 3/2000 | Halvorsen, Jr. | B29B 13/024 | 219/521 |
| 6,526,898 B1 * | 3/2003 | Ganeshan | F22B 37/10 | 110/322 |
| 6,619,952 B2 * | 9/2003 | Hohenshelt | F27B 17/02 | 432/120 |
| 7,387,762 B2 * | 6/2008 | Hirasawa | B22F 3/003 | 219/386 |
| 7,458,809 B2 * | 12/2008 | Hohenshelt | F27B 17/005 | 432/120 |
| 7,976,306 B2 * | 7/2011 | Perry | F16L 53/001 | 138/35 |
| 8,227,729 B2 * | 7/2012 | Sorabji | C30B 31/14 | 118/50.1 |
| 8,678,815 B2 * | 3/2014 | Frost | C21D 9/0018 | 432/12 |
| 2002/0102510 A1 * | 8/2002 | Tsuru | C30B 31/12 | 432/247 |
| 2004/0115583 A1 * | 6/2004 | Hohenshelt | F27B 17/005 | 432/156 |
| 2005/0106523 A1 | 5/2005 | Vangilbergen et al. | | |
| 2008/0187811 A1 * | 8/2008 | Crumm | H01M 8/0271 | 429/439 |
| 2009/0170047 A1 * | 7/2009 | Fan | C21D 9/0018 | 432/86 |
| 2010/0192659 A1 * | 8/2010 | Krajewski | B21D 22/201 | 72/349 |
| 2011/0253702 A1 | 10/2011 | Regan | | |
| 2011/0269088 A1 * | 11/2011 | Rohner | A61C 13/20 | 432/120 |
| 2012/0052457 A1 * | 3/2012 | Saito | C23C 16/46 | 432/206 |
| 2013/0180692 A1 | 7/2013 | Gomez et al. | | |
| 2013/0180693 A1 | 7/2013 | Gomez et al. | | |

* cited by examiner

HEAT CONTAINMENT APPARATUS

BACKGROUND

The present invention relates to heat containment apparatuses suited for use in high temperature operations of substrates, such as brazing of drill bits.

The manufacturing of many downhole tools includes applying a wear-resistant coating (e.g., a hardfacing on a cutting structure), attaching cutting structures (e.g., a braze to attach a cutter), and/or attaching wear-resistant elements to protect the surface of the downhole tool from wear and abrasion. The application of these coatings requires the surface of the downhole tool (or component thereof) be at elevated temperatures, e.g., 650° C.-760° C. (1200° F.-1400° F.) for brazing. The elevated temperature may, at least in part, assist with reducing residual moisture on a surface and mitigate differential thermal expansion of two or more components.

To achieve this the downhole tool is heated in a kiln, or similar apparatus, then removed to apply the coating. In order to keep the surface at an elevated temperature after removal from the kiln, workers wrap the downhole tool with a ceramic blanket (or wrap or tape). Then, as the ceramic blanket is carefully peeled away to ensure that no particulates remain on the surface, the coating is applied. If during this process the surface cools below a certain threshold, e.g., about 480° C. (900° F.) for brazing, the downhole tool must be reheated and rewrapped before the process can continue.

With this process, defects and potential failure points can manifest in several places. First, when wrapping the heated substrate, ceramic particulates and fibers from the wrapper can become fused to the surface of the tool. Particulates and fibers that are not removed can create surface areas where the coating may fail to properly adhere to the tool surface. Thus, ensuring the surface is clean for coating is often time consuming, thereby increasing the chances of needing to reheat and begin again. The reheating and continuation of coating can further create defects or points of potential failure where the first coating and second coating interface.

Additionally, this process requires workers to handle materials at extremely high temperatures. Further, many of the processes performed produce harmful air borne chemicals and particulates. While workers employ safety measures (such as, insulated gloves and coveralls and respiratory devices), an apparatus that reduces defects and potential failure points in the downhole tools while further reducing worker safety risk would be of benefit to one skilled in the art.

SUMMARY OF THE INVENTION

The present invention relates to heat containment apparatuses suited for use in high temperature operations of substrates, such as brazing of drill bits.

In some embodiments, the present invention provides a heat containment apparatus comprising a housing having an access gap, the housing being formed of an insulating material.

In other embodiments, the present invention provides a heat containment apparatus comprising a housing being an expandable structure having an access gap, the housing comprising an insulating material.

In still other embodiments, the present invention provides a heat containment apparatus comprising a housing comprising a heating element and an insulating material, the housing having an access gap.

In some embodiments, the present invention provides a heat containment apparatus comprising a housing comprising an insulating material, an access gap, and at least one selected from the group consisting of: a chimney, a removable access gap cover, a slideable access gap cover, a hinged access gap cover, a viewing window, a longitudinally expandable wall, a radially expandable wall, a hinged wall, a handle, a fluid port, a heating element, a fluid jacket, a reduced pressure container, a substrate holder, a base, and any combination thereof.

In other embodiments, the present invention provides a system comprising a heat containment apparatus that comprises a housing having an access gap, the housing being formed of an insulating material; a substrate holder capable of maintaining a substrate within the heat containment apparatus; and a ventilation element in fluid communication with the heat containment apparatus.

In still other embodiments, the present invention provides a method comprising heating at least a portion of a substrate to a first temperature; placing the portion of the substrate in a heat containment apparatus that comprises a housing having an access gap, the housing being formed of an insulating material; maintaining a first section of the portion of the substrate above a second temperature that is within about 50% of the first temperature; and performing a first high temperature operation on the first section of the portion of the substrate while the portion of the substrate is substantially within the heat containment apparatus.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

The present invention relates to heat containment apparatuses suited for use in high temperature operations of substrates, such as brazing of drill bits.

The heat containment apparatuses of the present invention are suitable for use in high temperature operations and allow for increased efficiency while enhancing worker safety. Heat containment apparatuses described herein may be capable of maintaining a substrate at elevated temperature for longer periods of time and with less chance of surface contamination than traditional methods. Further, the heat containment apparatuses may allow a worker to more readily access the substrate being treated. Together, these benefits may advantageously allow for higher quality downhole tools having been treated at high temperature (e.g., attachments via braze joints and wear-resistant hardfacings) without having to repeatedly heat the substrate.

The heat containment apparatuses may enhance worker safety in at least two ways. First, increased access to the substrate enhances worker safety by minimizing the risk of direct contact between the worker and the heated surface. Second, the heat containment apparatuses may incorporate specific design features that enhance worker safety. By way of nonlimiting example, ventilated heat containment apparatuses may reduce a worker's exposure risk to potentially harmful air borne substances. Further, heat containment apparatuses may provide a barrier to reduce the heat exposure to workers as a whole, both those that are performing high temperature operations and surrounding workers.

It should be noted that when "about" is provided at the beginning of a numerical list, "about" modifies each number of the numerical list. It should be further noted that in some numerical listings of ranges, some lower limits listed may be greater than some upper limits listed. One skilled in the art will recognize that the selected subset will require the selection of an upper limit in excess of the selected lower limit.

In some embodiments, a heat containment apparatus of the present invention may comprise a housing having an access gap such that the housing material comprises, consists essentially of, or consists of an insulating material. As used herein, the term "access gap" refers to an opening in a housing extending from one end of the object to the other end of the object along the longitudinal axis (or equivalent thereof) of the object that allows access to a substrate disposed within the housing. It should be noted that the heat containment apparatus of the present invention, in some embodiments, may be configured to have an access gap parallel to the plane of the ground, perpendicular to the plane of the ground, any angle therebetween, or any combination thereof. It should further be noted that each end may be open, partially open, closed, or partially closed.

Figure 1A:
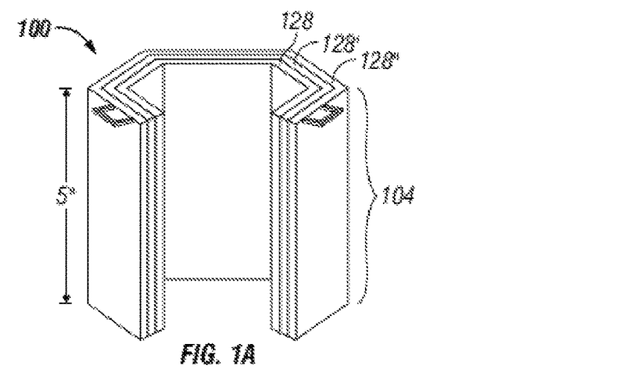
FIGS. 1A-C illustrate a nonlimiting example of a heat containment apparatus according to the present invention (not necessarily to scale).
Figure 1B:
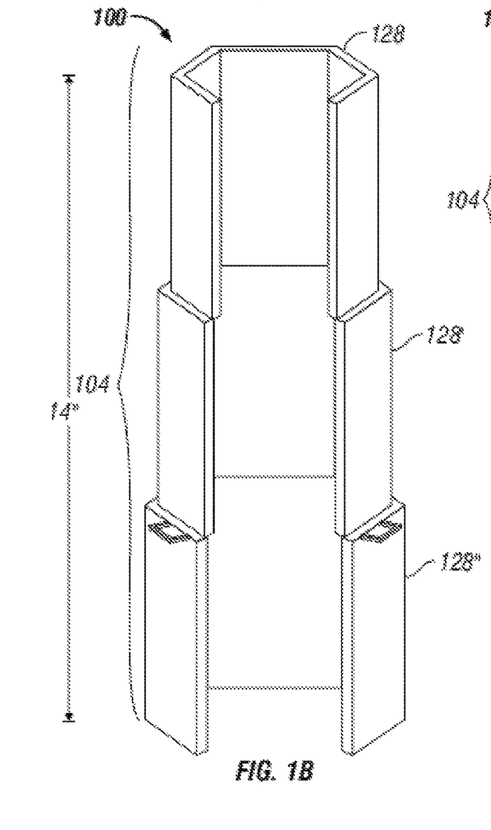
Figure 1C:
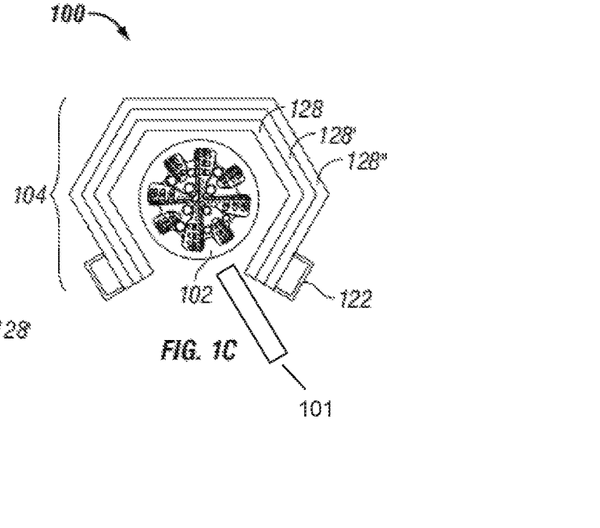

Referring now to the nonlimiting example of a heat containment apparatus of the present invention illustrated in FIGS. 1A-C, heat containment apparatus 100 comprises housing 104 for use in conjunction with substrate 102 (shown as a fixed cutter drill bit). Housing 104 has telescopic walls 128, 128', and 128" each being 12.7 cm (5 inches) in height. Telescopic walls 128, 128', and 128" are designed to extend with 1.3 cm (½ inch) overlap between walls 128 and 128' and walls 128' and 128" to a final height of 35.5 cm (14 inches). To assist in extension and retraction, wall 128" (the outer wall) has handle 122 attached thereto. By way of nonlimiting example, telescopic walls 128, 128', and 128" may be made of different materials. It should be noted that directional terms used in the description of a figure are provided for reference only and do not imply an operational limitation.

Figure 2A:
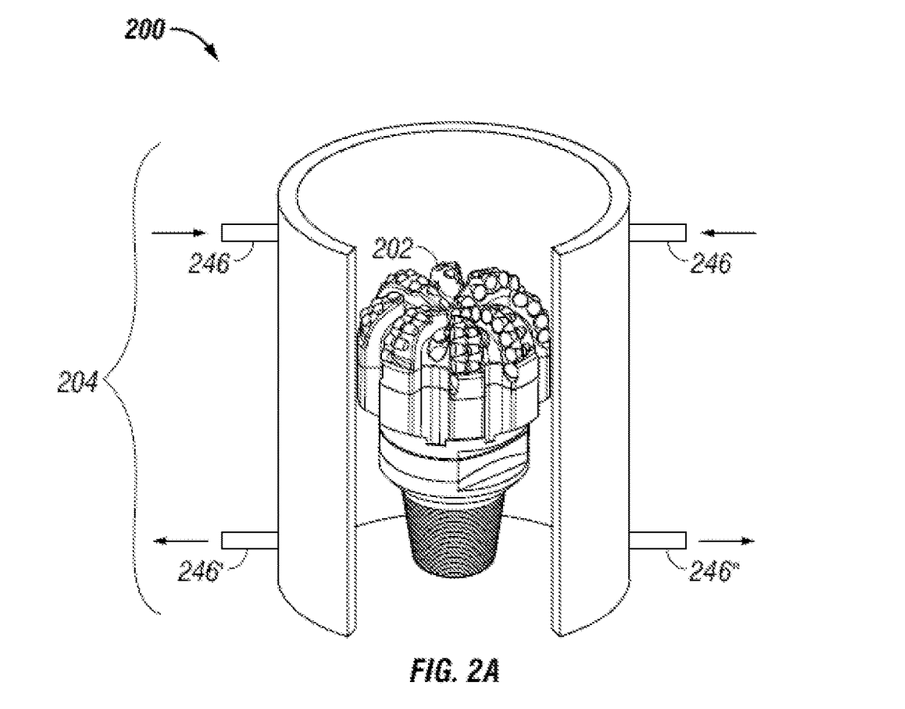
FIGS. 2A-B illustrate a nonlimiting example of a heat containment apparatus according to the present invention (not necessarily to scale).
Figure 2B:
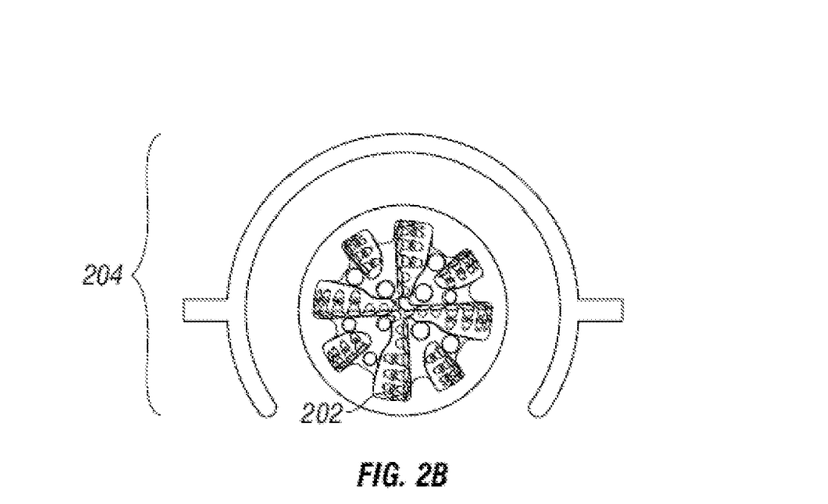

Referring now to the nonlimiting example of a heat containment apparatus of the present invention illustrated in FIGS. 2A-B, heat containment apparatus 200 comprises housing 204 for use in conjunction with substrate 202 (shown as a fixed cutter drill bit). Housing 204 is a fluid jacket configured for flowing a fluid material therethrough, where the fluid may serve to maintain, increase, or decrease the temperature of the substrate. Fluid ports 246 and 246' are configured for fluid flow into and out of, respectively, the fluid jacket.

Figure 3:
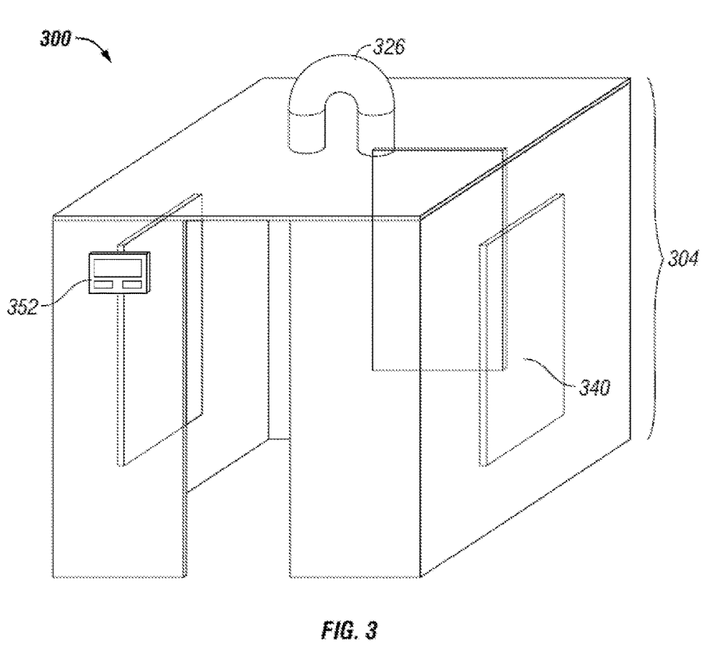
FIG. 3 illustrates a nonlimiting example of a heat containment apparatus according to the present invention (not necessarily to scale).

Referring now to the nonlimiting example of a heat containment apparatus of the present invention illustrated in FIG. 3, heat containment apparatus 300 comprises housing 304, heaters 340, hook 326, and control system 352. Control system 352 may be for setting and monitoring the temperature of heaters 340. Hook 326 allows for moving housing 304 with manipulators like cranes.

Figure 4A:
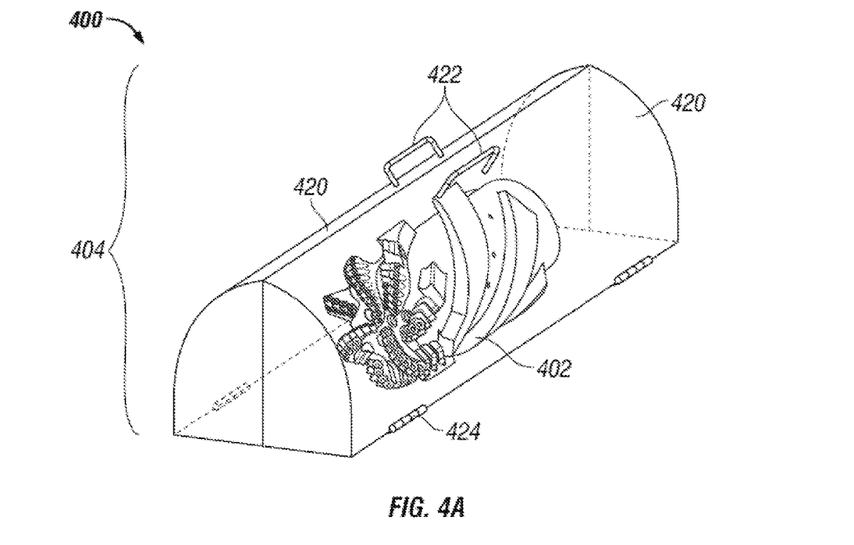
FIGS. 4A-B illustrate a nonlimiting example of a heat containment apparatus according to the present invention (not necessarily to scale).
Figure 4B:
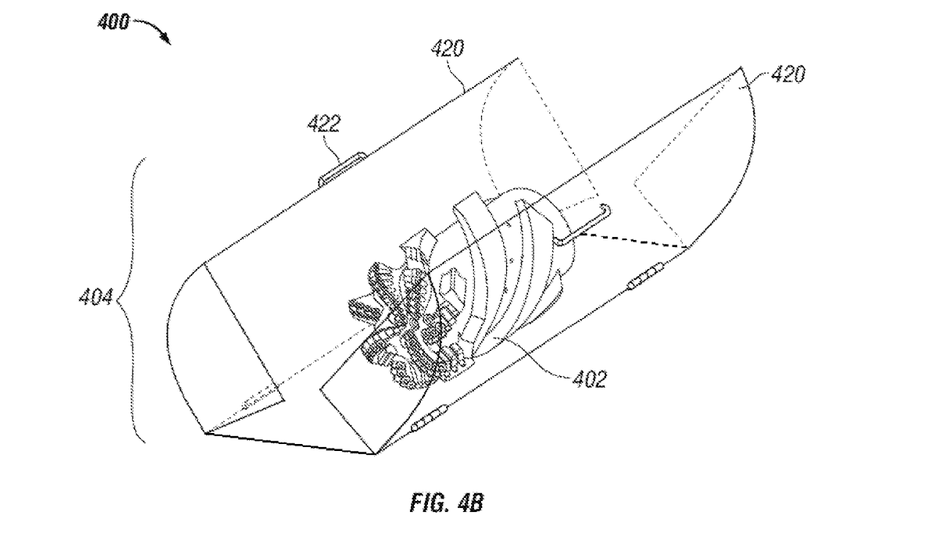

Referring now to the nonlimiting example of a heat containment apparatus of the present invention illustrated in FIGS. 4A-C, heat containment apparatus 400 comprises housing 404 for use in conjunction with substrate 402 (shown as a fixed cutter drill bit with sleeve). Heat containment apparatus 400 has covers 420 with hinges 424 and handles 422 allowing for a sizeable access gap.

Figure 5:
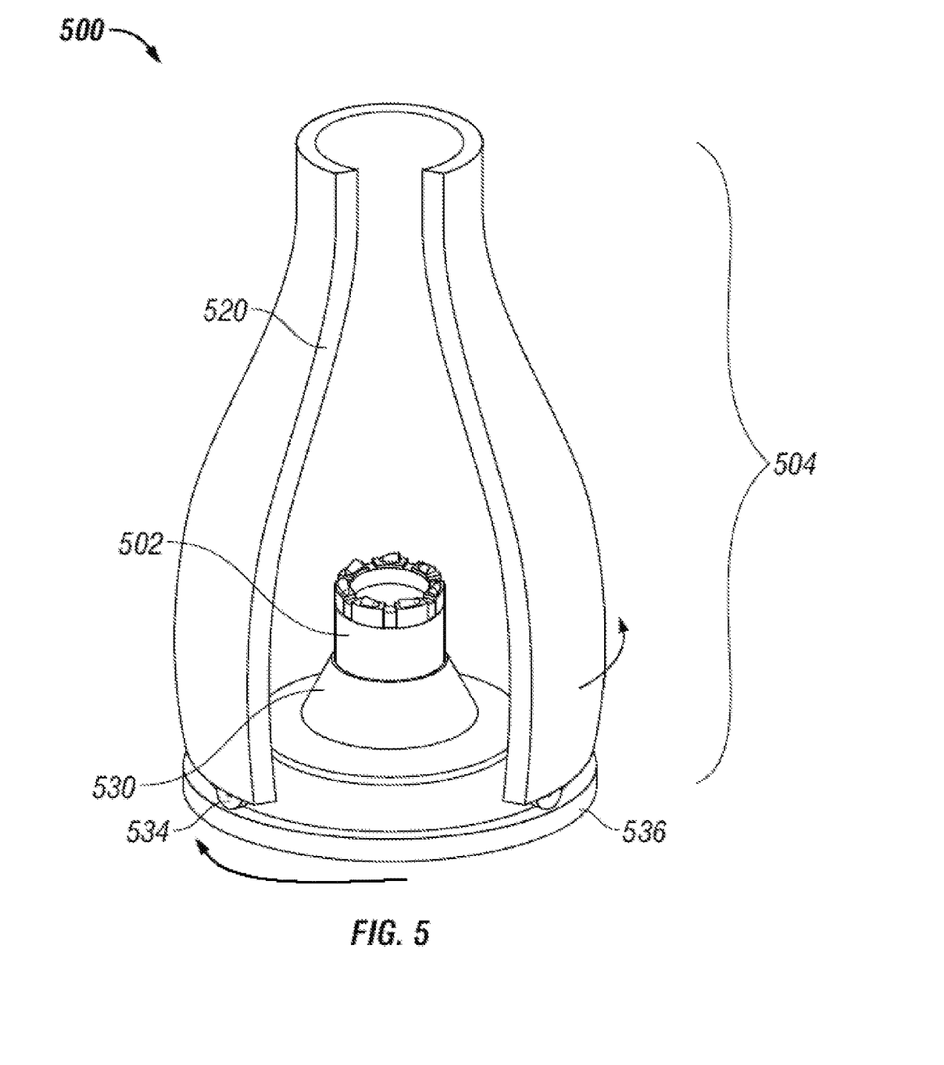
FIG. 5 illustrates a nonlimiting example of a heat containment apparatus according to the present invention (not necessarily to scale).

Referring now to the nonlimiting example of a heat containment apparatus of the present invention illustrated in FIG. 5, heat containment apparatus 500 comprises housing 504 for use in conjunction with substrate 502 (shown as a coring drill bit). Heat containment apparatus 500 has moveable covers 520 (shown as slideable doors) allowing for a sizeable access gap. Heat containment apparatus 500 also has base 536 and housing 504 with bearings 534 that allow for rotation of housing 504 relative to substrate 502. Further, base 536 has substrate holder 530 for securing substrate 502 in place.

Figure 6:
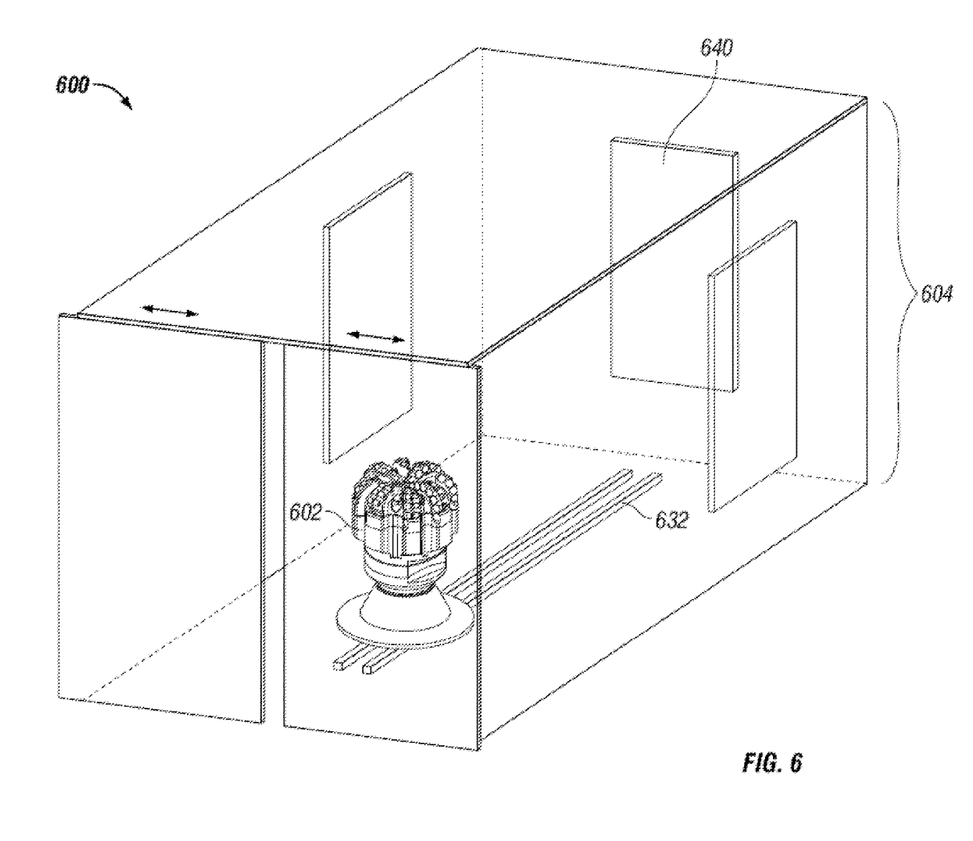
FIG. 6 illustrates a nonlimiting example of a heat containment apparatus according to the present invention (not necessarily to scale).

Referring now to the nonlimiting example illustrated in FIG. 6, heat containment apparatus 600 comprises housing 604, heaters 640, substrate holder operably connected to rails 632, and covers (shown as slideable doors). Rails 632 allow for movement of substrate 602 (shown here as a fixed cutter drill bit) between a heated area near heaters 640 and the access gap at covers.

Figure 7A:
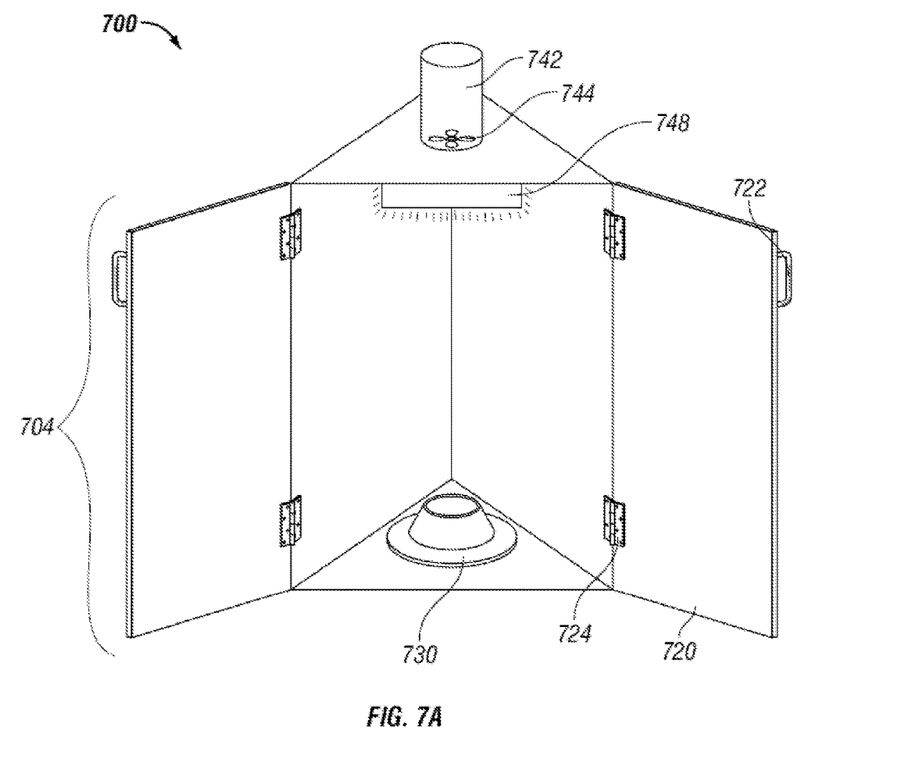
FIGS. 7A-B illustrate a nonlimiting example of a heat containment apparatus and a system according to the present invention (not necessarily to scale).
Figure 7B:
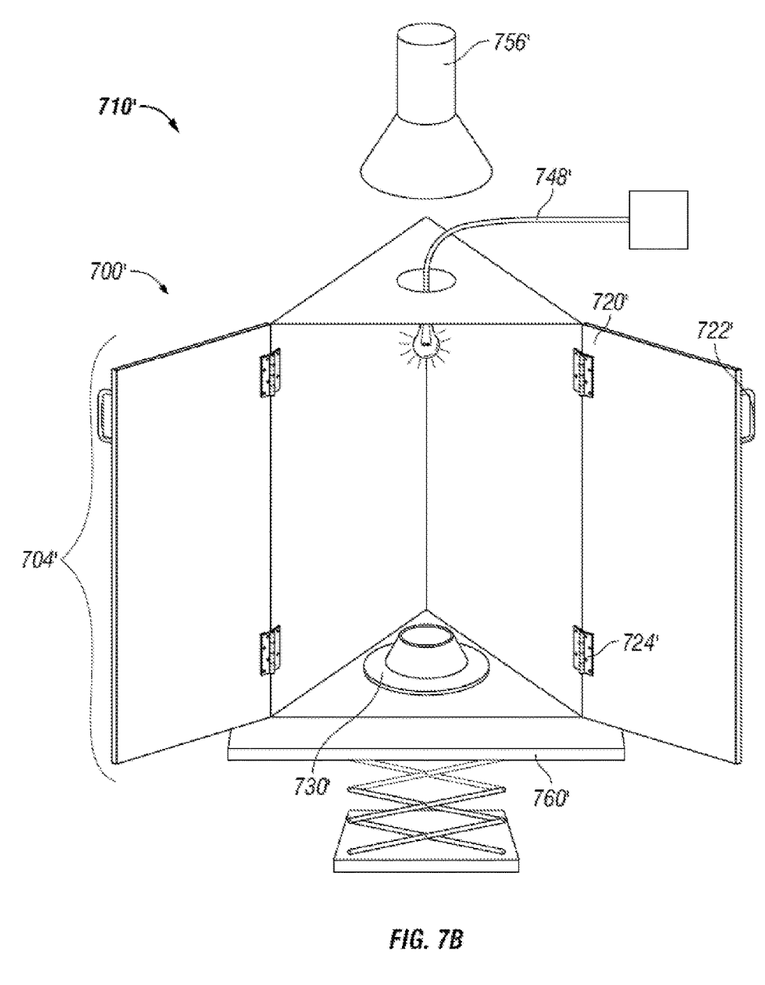

Referring now to the nonlimiting example of a heat containment apparatus of the present invention illustrated in FIG. 7A, heat containment apparatus 700 comprises housing 704, chimney 742 with fan 744, covers 720 (shown as hinged doors) with hinges 724 and handles 722, substrate holder 730, and light 748. In comparison, FIG. 7B illustrates a nonlimiting example of system 710' of the present invention comprising heat containment apparatus 700', ventilation system 756', light 748', and lift 760' having substrate holder 730'. Heat containment apparatus 700' comprises covers 720' with hinges 724' and handles 722'.

Figure 8:
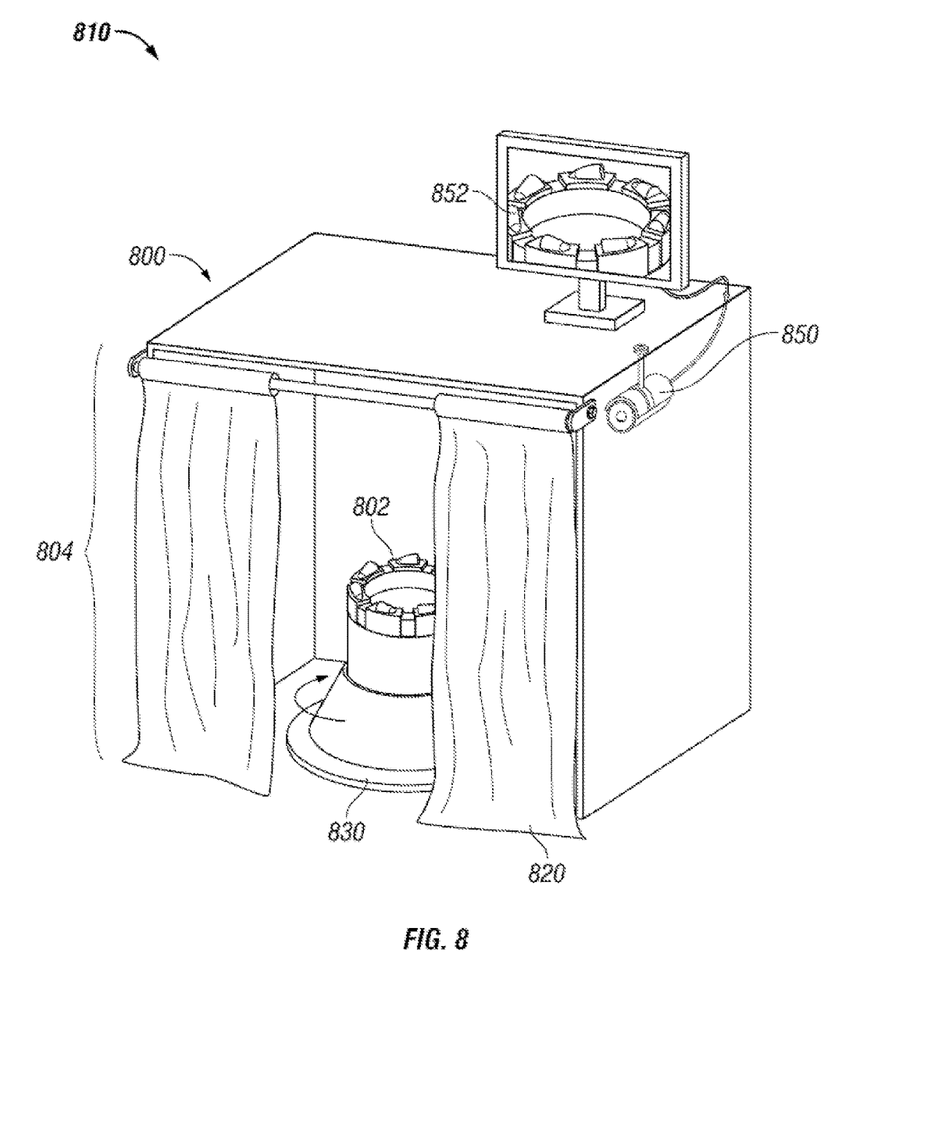
FIG. 8 illustrates a nonlimiting example of a system according to the present invention (not necessarily to scale).

Referring now to the nonlimiting of a system of the present invention example illustrated in FIG. 8, system 810 comprising heat containment apparatus 800, substrate holder 830 (shown as a turntable), and display 852. Heat containment apparatus 800 comprises housing 804, cover 820 (shown as a curtain), and camera 850. In this nonlimiting example, display 852 of system 810 is operably connected to camera 850 of heat containment apparatus 800. Within heat containment apparatus 800, substrate 802 (shown as a coring drill bit) can be monitored by camera 850 and shown on display 852.

Some embodiments may involve performing a high temperature operation or a low temperature operation on at least a portion of a substrate within a heat containment apparatus of the present invention. In some embodiments, an access gap of a heat containment apparatus of the present invention may be sized to allow workers to access a substrate.

As used herein, the term "high temperature operations" refers to methods, procedures, or techniques performed at temperatures above about 150° C. (300° F.). Nonlimiting examples of high temperature operations for use in conjunction with the apparatuses, systems, or methods of the present invention may include those used in operations like hardfacing, brazing, debrazing, welding, cutter removal, shrink fitting, creating interference connections between at least two components, connecting two or more components where at least one component is at an elevated temperature, assembling non-interference components where at least one component is at an elevated temperature, flame spraying, spray coating, applying an aerosolized heated metal, plasma spraying, vapor deposition, and the like, or any combination thereof. Further, high temperature operations may achieve changes to a substrate surface, which may include, but not be limited to, applying a surface coating, roughening or smoothing a surface, removing a surface coating, removing a portion of a surface, and the like.

As used herein, the term "low temperature operations" refers to methods, procedures, or techniques performed at temperatures below about 0° C. (32° F.). Nonlimiting examples of low temperature operations for use in conjunction with the apparatuses, systems, or methods of the present invention may include those used in operations like cutter removal, shrink fitting, creating interference connections between at least two components, connecting two or more components where at least one component is at a reduced temperature, assembling non-interference components where at least one component is at a reduced temperature, spray coating, and the like, or any combination thereof.

As used herein, the terms "operation" and "operations" encompasses both low temperature operations and high temperature operations.

As used herein, the term "substrate" refers to a material to which an operation is conducted. Suitable substrates for use in conjunction with the apparatuses, systems, or methods of the present invention may include, but not be limited to, those capable of maintaining their integrity at elevated and/or reduced temperatures including, but not limited to, metals, ceramics, glasses, carbons (e.g., graphite), polymers, high-temperature polymers, nanocomposites, high-temperature nanocomposites, composites thereof, or any combination thereof. In some embodiments, substrates may be capable, wholly or in part, of withstanding temperatures of about 150° C. (300° F.) and above or 0° C. (32° F.) and below. Nonlimiting examples of substrates may include downhole tools, downhole tool parts, drill bits, fixed angle drill bits, roller cone drill bits, coring drill bits, reamers, stabilizers, screens, hole openers, pipes, sleeves, cutters, cutting elements, motor parts, saws, chisels, plows, and the like, or components thereof.

In some embodiments, as shown for example in FIG. 1C, an access gap of a heat containment apparatus 100 of the present inventions may be sized to allow workers to access a substrate 102 by disposing at least a portion of a tool 101 from outside the heat containment apparatus 100 through the access gap for performing operations.

As used herein, the term "tool" refers generally to a tool or piece of equipment needed in performing high temperature operations or low temperature operations. Suitable tools for use in conjunction with the apparatuses, systems, or methods of the present invention may include, but not be limited to, torches, welders, brazing torches, hardfacing torches, plasma torches, aerosolizers, sprayers, grasping tools, substrate manipulators, cutter manipulator, pliers, tweezers, screwdrivers, chisels, tongs, sand blasting tools, grinding tools, cutting tools, wire feeder, flux application tools, flux guns, scoops, gas nozzles, liquid nozzles, liquid dispensers, suction devices, extraction devices, guides, lifting devices, robotic fixtures, robotic arms, devices to automatically manipulate any one or a combination thereof, and the like, or any combination thereof. In some embodiments, an access gap of a heat containment apparatus of the present invention may be sized to allow workers access to a substrate with more than one tool. In some embodiments, an access gap of a heat containment apparatus of the present invention may be sized to allow more than one worker access to a substrate. It should be understood the access gap of a heat containment apparatus of the present invention should be sized according to the above needs, which depend, inter alia, on the tools and high temperature operation. In some embodiments, an access gap of a heat containment apparatus of the present invention may be sized to have an opening width (or equivalent) ranging from a lower limit of about 2.5 cm (1 inch), 5.1 cm (2 inches), 7.6 cm (3 inches), 15.2 cm (6 inches), or 30.5 cm (1 foot) to an upper limit of about 61 cm (2 feet), 45.7 cm (1.5 feet), 30.5 cm (1 foot), or 15.2 cm (6 inches), wherein the opening width may range from any lower limit to any upper limit and encompass any subset therebetween. In some embodiments, an access gap may be sized to allow for the substrate to pass therethrough.

In some embodiments, an access gap of a heat containment apparatus of the present invention may be capable of resizing on-the-fly, including from completely closed to a desired access gap size or from a first access gap size to a second access gap size. In some embodiments, a first portion of a housing may be movable relative to the remaining portion of the housing. By way of nonlimiting example, a wall of a housing may be slideable to allow for the size of an access gap to transition from an access gap of about 5.1 cm (2 inches) to an access gap size of about 15.2 cm (6 inches). Resizeable access gaps of a heat containment apparatus of the present invention, in some embodiments, may allow for minimizing heat loss therethrough, e.g., when various tools of a high temperature operation require different size access gaps. Further, a resizeable access gap may allow for a single heat containment apparatus to be useable for multiple operations.

Housings of a heat containment apparatus of the present invention may be sized to receive at least a portion of a substrate. Suitable housings may be of any shape including, but not limited to, cylindrical (with any shaped cross-section, e.g., circular, ovular, polygonal, polygonal with rounded corners, or any hybrid thereof), spherical, 3D-polygonal (e.g., icosahedral), 3D-polygonal with rounded edges, or any hybrid thereof. Suitable housings may have a longitudinal direction and any radial cross-sectional shape including, but not limited to, circular, ovular, polygonal, polygonal with rounded corners, or any hybrid thereof. Housings of a heat containment apparatus of the present invention may have different cross-sectional sizes and/or shapes at different cross-sections, e.g., conical, pyramidal, square boxes that transition to cones, and the like. In some embodiments, a housing may be sized to have at least one dimension ranging from a lower limit of about 12.7 cm (5 inches), 20.3 cm (8 inches), 25.4 cm (10 inches), 30.5 cm (1 foot), 45.7 cm (1.5 feet), or 61 cm (2 feet) to an upper limit of about 152 cm (5 feet), 122 cm (4 feet), 91 cm (3 feet), or 61 cm (2 feet), wherein the size in at least one dimension may range from any lower limit to any upper limit and encompass any subset therebetween.

In some embodiments, a heat containment apparatus of the present invention may comprise an expandable housing.

Expandable housings may be capable of expanding longitudinally and/or radially. Suitable expandable housings of a heat containment apparatus of the present invention may include, but not be limited to, longitudinally expandable walls, e.g., telescopic walls or accordion walls that expand and contract longitudinally; radially expandable walls, e.g., walls stable at more than one cross-sectional size and/or shape, accordion walls that expand to transition from a square to a rectangular cross-sectional shape, or walls comprising bistable cells capable of transition from a first circular cross-sectional shape to a second circular cross-sectional shape with a greater diameter than the first circular cross-sectional shape; or any combination thereof, e.g., spherical housings capable of at least two stable circumferences.

In some embodiments, a heat containment apparatus of the present invention may comprise a housing with hinged walls. By way of nonlimiting example, hinged walls may provide a clamshell-like housing with an access gap that is adjustable relative to the operation to be performed.

In some embodiments, a housing of a heat containment apparatus of the present invention may comprise a frame and an insulating material. In some embodiments, the housing may be an enclosure for containing a fluid material that is heated or cooled. The enclosure may allow for movement and/or cycling of the fluid material. In some embodiments, an enclosure may contain a fluid material at an increased or decreased pressure. By way of nonlimiting example, a housing may be a quartz enclosure with a lower pressure therein, like a vacuum flask. By way of another nonlimiting example, a housing may be a ceramic enclosure shaped similar to a tightly coiled pipe through which a high-temperature mineral oil can be flowed.

In some embodiments, an access gap may have a cover. In some embodiments, the cover for an access gap may be an integral part of the housing. In some embodiments, a cover for an access gap may be removable, movable, slideable, retractable, rollable, or the like. By way of nonlimiting examples, a cover for an access gap may be configured like a lid, a hinged-door, a slideable-door, a shade, a curtain, or any hybrid thereof. In some embodiments, a cover for an access gap may be electronically actuated, pneumatically actuated, hydraulically actuated, fluid actuated, magnetically actuated, and the like, or any combination thereof.

In some embodiments, a housing of a heat containment apparatus of the present invention may be formed from housing materials that comprise, consist essentially of, or consist of insulating materials. Suitable insulating materials may include, but not be limited to, ceramics (e.g., oxides, carbides, borides, nitrides, and silicides that may be crystalline, non-crystalline, or semi-crystalline), polymers, insulating metal composites, carbons, nanocomposites, foams, fluids (e.g., air), any composite thereof, or any combination thereof. Insulating materials may include, but not be limited to, materials in the form of beads, particulates, flakes, fibers, wools, woven fabrics, bulked fabrics, sheets, bricks, stones, blocks, cast shapes, molded shapes, foams, sprayed insulation, and the like, any hybrid thereof, or any combination thereof. Examples of suitable insulating materials may include, but not be limited to, ceramics, ceramic fibers, ceramic fabrics, ceramic wools, ceramic beads, ceramic blocks, moldable ceramics, woven ceramics, cast ceramics, fire bricks, carbon fibers, graphite blocks, shaped graphite blocks, polymer beads, polymer fibers, polymer fabrics, nanocomposites, fluids in a jacket, metal fabrics, metal wools, metal castings, and the like, any composite thereof, or any combination thereof.

In embodiments where a housing consisting essentially of or consisting of insulating materials, the insulating materials may be capable of forming self-supported structures. Such suitable insulating materials may include, but not be limited to, ceramics, ceramic fibers, ceramic blocks, moldable ceramics, woven ceramics, cast ceramics, fire bricks, carbon fibers, graphite blocks, shaped graphite blocks, nanocomposites, fluids in a jacket, metal fabrics, metal wools, metal castings, insulating metal composites, and the like, any composite thereof, or any combination thereof.

Suitable insulating materials for use in conjunction with a heat containment apparatus described herein may be capable of maintaining a substrate placed therein at temperatures ranging from a lower limit of about −200° C. (−325° F.), −100° C. (−150° F.), 0° C. (32° F.), 150° C. (300° F.), 175° C. (350° F.), 260° C. (500° F.), 400° C. (750° F.), 480° C. (900° F.), or 535° C. (1000° F.) to an upper limit of about 870° C. (1600° F.), 815° C. (1500° F.), 705° C. (1300° F.), 535° C. (1000° F.), 260° C. (500° F.), 0° C. (32° F.), or −100° C. (−150° F.), wherein the temperature may range from any lower limit to any upper limit and encompass any subset therebetween. Suitable insulating materials may be able to withstand temperatures ranging from a lower limit of about −200° C. (−325° F.), −100° C. (−150° F.), 0° C. (32° F.), 150° C. (300° F.), 260° C. (500° F.), 400° C. (750° F.), or 535° C. (1000° F.) to an upper limit of about 870° C. (1600° F.), 815° C. (1500° F.), 705° C. (1300° F.), 535° C. (1000° F.), 0° C. (32° F.), or −100° C. (−150° F.), wherein the temperature may range from any lower limit to any upper limit and encompass any subset therebetween. One skilled in the art with the benefit of this disclosure should understand the insulating material should be appropriately chosen for the substrate temperature to be maintained. By way of nonlimiting example, a housing formed with an insulating material comprising a polymer may be better suited for use with substrates that need be maintained between temperatures of about 175° C. (350° F.) to about 260° C. (500° F.). Whereas, housings formed with an insulating material comprising ceramic bricks may be used with substrates that need to be maintained at temperatures up to about 870° C. (1600° F.).

In addition to the housing having an access gap and the insulating material, a heat containment apparatus of the present invention may further comprise, consist essentially of, or consist of one or more thermal elements configured to be in thermal communication with a substrate disposed therein. In some embodiments, a heat containment apparatus may comprise thermal elements configured to move in and out of thermal communication with a substrate disposed therein. Thermal elements may be heating elements or cooling elements. In some embodiments, a heat containment apparatus may comprise both heating elements and cooling elements. In some embodiments, a heat containment apparatus may comprise at least two zones where the first zone provides for a substrate to be in thermal communication with thermal elements and the second zone provides for the substrate to not be in thermal communication with thermal elements, e.g. the heat containment apparatus shown in FIG. 6.

Suitable heating elements for use in conjunction with a heat containment apparatus described herein may include, but not be limited to, radiant heaters, electric heaters, infrared heaters, induction heaters, heating bands, heated coils, burning materials, heated fluids (flowing or static), exothermic chemical reactions, nuclear reactions, or any combination thereof. Suitable configuration for heating elements may include, but not be limited to, coils, plates, strips, finned strips, and the like, or any combination thereof. Suitable thermal elements for use in conjunction with a heat containment apparatus described herein may be capable of maintaining a substrate at temperatures ranging from a lower limit of about 150° C. (300° F.), 175° C. (350° F.), 260° C. (500° F.), 400° C. (750° F.), 480° C. (900° F.), or 535° C. (1000° F.) to an upper limit of about 870° C. (1600° F.), 815° C. (1500° F.), 705° C. (1300° F.), 535° C. (1000° F.), 260° C. (500° F.), wherein the temperature may range from any lower limit to any upper limit and encompass any subset therebetween. In some embodiments, a substrate may be electrically heated.

Suitable cooling elements for use in conjunction with a heat containment apparatus described herein may include, but not be limited to, electric coolers, thermoelectric coolers, cooling coils, cooled fluids (flowing or static), endothermic chemical reactions, or any combination thereof. Suitable configuration for cooling elements may include, but not be limited to, coils, plates, strips, finned strips, and the like, or any combination thereof. Suitable thermal elements for use in conjunction with a heat containment apparatus described herein may be capable of maintaining a substrate at temperatures ranging from a lower limit of about −200° C. (−325° F.), −100° C. (−150° F.), −50° C. (−60° F.), or 0° C. (32° F.), to an upper limit of about 0° C. (32° F.), −50° C. (−60° F.), or −100° C. (−150° F.), wherein the temperature may range from any lower limit to any upper limit and encompass any subset therebetween.

In some embodiments, thermal elements for use in conjunction with a heat containment apparatus described herein may be relationally configured to be separated from a substrate disposed within the heat containment apparatus by a distance ranging from a lower limit of physical contact, about 0.1 cm (0.04 inches), about 0.2 cm (0.08 inches), about 0.5 cm (0.2 inches), about 1 cm (0.4 inches), or about 5.1 cm (2 inches) to an upper limit of about 25 cm (9.8 inches), 10 cm (3.9 inches), 5.1 cm (2 inches), 2.5 cm (1 inch), 2 cm (0.8 inches), 1.5 cm (0.6 inches), or 1 cm (0.4 inches), and wherein the distance may range from any lower limit to any upper limit and encompass any subset therebetween. It should be noted that when thermal contact is not desired, e.g., when thermal elements are capable of moving in and out of thermal contact with a substrate, the thermal elements may be configured to be more than 25 cm (9.8 inches) from the substrate.

In some embodiments, a housing of a heat containment apparatus described herein may comprise an internal reflective coating. Such a coating may be beneficial in maintaining elevated and/or reduced temperatures within said housing. Suitable reflective coatings may be adhered to and/or sprayed onto at least a portion of the internal surface of the housing.

In some embodiments, a heat containment apparatus of the present invention may comprise features including, but not limited to, substrate holders, bearings, sensors, cameras, viewing windows, lights, handles, hooks, fluid ports, chimneys, vents, fluid handling devices, a base, electromagnetic field generators, magnetic field generators, tubings, and the like, or any combination thereof.

In some embodiments, in addition to the housing having an access gap and the insulating material, a heat containment apparatus of the present invention may further comprise, consist essentially of, or consist of one or more substrate holders to secure a substrate therein. In some embodiments, substrate holders for use in conjunction with a heat containment apparatus described herein may comprise threads, mandrels, pins, posts, and the like, or any combination thereof.

Substrate holders for use in conjunction with a heat containment apparatus described herein may, in some embodiments, also be capable of moving relative to the access gap. Movement of the substrate may include, but not be limited to, angularly (e.g., tilting), rotationally (e.g., spinning and turning), vertically, laterally, and any combination thereof. In some embodiments, substrate holders may comprise bearings, chucks, turntables, positioners, lifts, rails, and the like, or any combination thereof. By way of nonlimiting example, a substrate holder may be a turntable within the housing that allows for the substrate to rotate so that all surfaces of the substrate to be treated can be accessed. By way of another nonlimiting example, a substrate holder may be on rails that allow for the substrate to be moved to different areas of the heat containment apparatus like between areas with active heating and areas closer to the access gap. Further, in some embodiments, substrate holders may be rotatable in one direction and the housing may be capable of rotating in another direction.

Further, substrate holders for use in conjunction with a heat containment apparatus described herein may also be capable of maintaining a portion of the substrate at a reduced temperature. By way of nonlimiting example, a substrate holder for a drill bit may actively or passively keep the threads of the drill bit at a temperature lower than the portion of the drill bit to be treated, e.g., during a brazing operation.

In some embodiments, in addition to the housing having an access gap and the insulating material, a heat containment apparatus of the present invention may further comprise, consist essentially of, or consist of one or more bearings (or the like) to provide movement of the heat containment apparatus or a component thereof (e.g., the housing). A nonlimiting example of a heat containment apparatus having bearings is illustrated in FIG. 5.

In some embodiments, in addition to the housing having an access gap and the insulating material, a heat containment apparatus of the present invention may further comprise, consist essentially of, or consist of one or more sensors to provide feedback as to the conditions within the heat containment apparatus and/or on the substrate. Suitable sensors for use in conjunction with a heat containment apparatus described herein may, in some embodiments, include, but not be limited to, thermocouples, thermosensors (e.g., infrared thermometer), gas sensors (e.g., carbon monoxide sensors), chemical sensors (e.g., copper sensors), particulate sensors, magnetic field sensors, and the like, or any combination thereof. Suitable conditions to be measured may include, but not be limited to, surface temperature for substrates (including at multiple points on the surface), temperature of a portion of the housing, temperature of the air within the housing, composition and/or concentration of components within the gas in the housing, composition and/or concentration of components within the gas being exhausted from the housing, size of particulates suspended in the gas in the housing and/or being exhausted from the housing, strength of a magnetic field, or any combination thereof.

In some embodiments, in addition to the housing having an access gap and the insulating material, a heat containment apparatus of the present invention may further comprise, consist essentially of, or consist of one or more cameras to provide multiple viewing angles of substrates within the heat containment apparatus. Further, said cameras may be capable of recording (with individual frames and/or continuously) the high temperature operation performed within the heat containment apparatus. In some embodiments, said camera may be capable of manipulation (e.g., changing angles and/or zoom) during a high temperature operation. Suitable cameras for use in conjunction with a heat containment apparatus described herein may, in some embodiments, include, but not be limited to, optical cameras, thermal imaging cameras, cameras capable of detecting at least one wavelength from about ultraviolet light to about infrared light, or any combination thereof.

In some embodiments, in addition to the housing having an access gap and the insulating material, a heat containment apparatus of the present invention may further comprise, consist essentially of, or consist of one or more viewing windows to provide for multiple angles of viewing by one or more workers. It should be noted that viewing windows may be placed anywhere in relation to the access gap. Further, viewing windows may be of different sizes and/or shapes.

In some embodiments, in addition to the housing having an access gap and the insulating material, a heat containment apparatus of the present invention may further comprise, consist essentially of, or consist of one or more lights to provide enhanced viewing of the substrate. Suitable lights for use in conjunction with a heat containment apparatus described herein may, in some embodiments, include, but not be limited to, white lights, colored lights, and the like. Lights may be mounted in any way known to one skilled in the art including, but not limited to, integrated as part of the housing, on or in a movable arm (e.g., a swivel arm or a snake-like device), and the like. In some embodiments, lights may be used in the operation of other features of the heat containment apparatus. By way of nonlimiting example, a white light may be used in conjunction with a camera or scanning device capable of providing data as to the thickness of a surface coating being applied or removed.

In some embodiments, in addition to the housing having an access gap and the insulating material, a heat containment apparatus of the present invention may further comprise, consist essentially of, or consist of one or more hooks and/or handles to provide points of attachment for the heat containment apparatus. In some embodiments, the points of attachment may be used in conjunction with moving the heat containment apparatus or a component thereof (like a cover). By way of nonlimiting example, a heat containment apparatus may comprise a hook, or series of hooks, that allows for operable connection to a crane such that the heat containment apparatus may be lowered into position around a substrate to undergo a high temperature operation.

In some embodiments, in addition to the housing having an access gap and the insulating material, a heat containment apparatus of the present invention may further comprise, consist essentially of, or consist of one or more fluid ports for actively moving fluids (gases and/or liquid) into and out of the heat containment apparatus. It should be noted that said fluids may comprise particulates. By way of nonlimiting example, a fluid port may be operably connected to a ventilation device to assist in the removal of fumes and/or air borne particulates that may be hazardous to workers. In some embodiments, fluid ports may be capable of on-the-fly opening, closing, partially opening, partially closing, and the like.

In some embodiments, fluid ports may be used in conjunction with creating a controlled environment around at least a portion of the substrate. Examples of controlled environments may include, but not be limited to, inert gases, reactive gases, and the like. By way of another nonlimiting example, a fluid port may be at the top of a heat containment apparatus for introducing argon into the housing to provide a controlled environment around at least a portion of the substrate.

In some embodiments, in addition to the housing having an access gap and the insulating material, a heat containment apparatus of the present invention may further comprise, consist essentially of, or consist of one or more chimneys (or flues) and/or vents to assist in directing fluid flow and heat dissipation away from workers. Said direction may be passive or active.

In some embodiments, in addition to the housing having an access gap and the insulating material, a heat containment apparatus of the present invention may further comprise, consist essentially of, or consist of one or more fluid handling devices. Fluid handling devices for use in conjunction with a heat containment apparatus described herein may, in some embodiments, be suitable for use in conjunction with fluid insulating materials, fluid inlets, chimneys, vents, and the like. Suitable fluid handling devices may, in some embodiments, include, but not be limited to, dampers, fans, blowers, pumps, and the like.

In some embodiments, in addition to the housing having an access gap and the insulating material, a heat containment apparatus of the present invention may further comprise, consist essentially of, or consist of a base to provide stability and/or movement of the heat containment apparatus. By way of nonlimiting example, a base may comprise bearings that allow for the heat containment apparatus to move relative to the substrate disposed therein.

In some embodiments, in addition to the housing having an access gap and the insulating material, a heat containment apparatus of the present invention may further comprise, consist essentially of, or consist of one or more electromagnetic field generators for producing electromagnetic radiation with the heat containment apparatus. In some embodiments, the electromagnetic radiation may interact with a portion of the substrate and/or an aspect of the high temperature operation (e.g., a surface coating being applied or removed). Suitable electromagnetic radiation to be produced may include, but not be limited to, x-rays, near infrared light, and microwaves. By way of nonlimiting example, a brazed substrate may include within the braze a nanoparticle that produces heat when exposed to microwaves. Removal of the braze may be enhanced by exposing the braze to microwaves and radiant heat.

In some embodiments, in addition to the housing having an access gap and the insulating material, a heat containment apparatus of the present invention may further comprise, consist essentially of, or consist of one or more magnetic field generators. In some embodiments, magnetic field generators may be for generating magnetic fields about at least a portion of a substrate and/or for use in conjunction with operations performed within the heat containment apparatus. Magnetic fields may be produced from any suitable source including, but not limited to, electromagnets, permanent magnets, temporary magnets, and the like, or any combination thereof. By way of nonlimiting example, a heat containment apparatus may include a magnetic field across the access gap so as to attract and trap any small magnetic particles produced during an operation, which may advantageously reduce the potential exposure of workers to said particles. By way of another nonlimiting example, an electromagnetic field may be used in conjunction with heating a portion of a substrate via induction heating while within the heat containment apparatus.

In some embodiments, in addition to the housing having an access gap and the insulating material, a heat containment apparatus of the present invention may further comprise, consist essentially of, or consist of one or more tubings. Tubings may be for a plurality of uses including, but not limited to, in conjunction with flowing fluids, inductive coils, maintaining magnetic fields, and the like.

In some embodiments, a control system may be interfaced with a component of a heat containment apparatus. As used herein, the term "control system" refers to a system that can operate to receive and send electronic signals and may include functions of interfacing with a user, providing data readouts, collecting data, storing data, changing variable setpoints, maintaining setpoints, providing notifications of failures, and any combination thereof. Suitable control mechanisms may include, but are not limited to, variable transformers, ohmmeters, programmable logic controllers, digital logic circuits, electrical relays, computers, virtual reality systems, and any combination thereof. Suitable heat containment apparatus components that may be operably connected to a control system may include, but not be limited to, movable components (like movable covers, movable walls, and sizable access gaps), heaters, sensors, cameras, lights, fluid handling devices, a base (including a movable base), substrate holders (including movable substrate holders), electromagnetic field generators, and the like, or any combination thereof. It should be noted that a heat containment apparatus may have more than one control system that can interface with any number of heat containment apparatus components. Nonlimiting examples of control systems may include heat temperatures setpoint and readout interfaces for heaters, a plurality of temperature and gas sensors connected to a single readout panel, and a camera connected to a computer running a program to provide the thickness of a coating being applied.

In some embodiments, a system may comprise a heat containment apparatus according to any embodiment described herein. In some embodiments, features and components of a heat containment apparatus described above may be features and components of a system including, but not limited to, sensors, cameras, lights, fluid handling devices, substrate holders, electromagnetic field generators, control systems, and the like, or any combination thereof. It should be noted that the distinction between features and components being part of a heat containment apparatus and a system is that as a part of a heat containment apparatus features and components are integral with the housing.

In some embodiments, additional features and components of a system may include, but not be limited to, ventilation elements and manipulators.

Suitable ventilation elements may include, but not be limited to, vent hoods, vacuums, fans, and the like, or any combination thereof.

Suitable manipulators may include, but not be limited to, cranes, hooks, swivel arms, mandrels, lifts, tool balancers, turntables, fluid powered cylinders (e.g., pneumatic or hydraulic including those using ferrofluids), fluid powered actuators (e.g., pneumatic or hydraulic including those using ferrofluids), electrical actuators, motors, and the like, or any combination thereof. Manipulators may be capable of operably connecting to housings, features and components of housings (like hooks and handles), and/or substrate holders. By way of nonlimiting example, a housing comprising a hook may be operably connected to a crane for raising and lowering over a substrate. By way of another nonlimiting example, a substrate holder may be operably connected to a lift capable of raising and lowering a substrate into a housing. By way of another nonlimiting example, a system may include swivel arms for moving a substrate from a heated area, like a kiln, to a heat containment apparatus.

In some embodiments, a heat containment apparatus and/or a system may be used when performing operations. In some embodiments, more than one operation may be performed on at least a portion of a substrate while utilizing a heat containment apparatus and/or system according to any embodiment described herein. Some embodiments may involve performing six or more operations on a substrate. Said operations may include both high temperature operations and low temperature operations.

Some embodiments may involve heating and/or cooling a substrate while in a heat containment apparatus according to any embodiment described herein. Some embodiments may involve manipulating a substrate during an operation. Some embodiments may involve moving a substrate through a heat containment apparatus (e.g., the housing) and/or the system while performing an operation. Some embodiments may involve moving a substrate between zones of a heat containment apparatus and/or system, e.g., moving into and out of thermal communication with a thermal element of the heat containment apparatus and/or system.

Some embodiments may involve heating and/or cooling at least a portion of a substrate to a temperature ranging from a lower limit of about −200° C. (−325° F.), −100° C. (−150° F.), 0° C. (32° F.), 150° C. (300° F.), 175° C. (350° F.), 260° C. (500° F.), 400° C. (750° F.), 480° C. (900° F.), or 535° C. (1000° F.) to an upper limit of about 870° C. (1600° F.), 815° C. (1500° F.), 705° C. (1300° F.), 535° C. (1000° F.), 260° C. (500° F.), 0° C. (32° F.), or −100° C. (−150° F.), wherein the temperature may range from any lower limit to any upper limit and encompass any subset therebetween. Some embodiments may involve heating and/or cooling at least a portion of a substrate to an effective temperature to contract or expand the substrate by a desired amount. By way of nonlimiting example, a pipe may be cooled with liquid nitrogen in a heat containment apparatus thereby reducing the diameter of the pipe. Then the cooled pipe may be placed inside a sleeve such that when the pipe returns to room temperature the sleeve and pipe are substantially inseparable. To achieve the same result in another nonlimiting example, the sleeve may be heated in a heat containment apparatus so as to increase the inner diameter of the sleeve so that the pipe will fit into the sleeve. Similar to the previous example, once cooled the sleeve and pipe are substantially inseparable.

Some embodiments may involve placing at least a portion of a substrate into the heat containment apparatus. Some embodiments may involve placing at least a portion of a substrate into the heat containment apparatus while the substrate is at an elevated or reduced temperature. It should be noted that placing at least a portion of a substrate into a heat containment apparatus includes placing the heat containment apparatus about at least a portion of the substrate without moving the substrate.

Some embodiments may involve heating at least a portion of a substrate to a first temperature; placing the portion of the substrate in a heat containment apparatus according to any embodiment described herein; maintaining a first section of the portion of the substrate above a second temperature; and performing a first high temperature operation on the first section of the portion of the substrate while the portion of the substrate is substantially within the heat containment apparatus. In some embodiments, heating may occur in the heat containment apparatus. In some embodiments, the second temperature may be warmer or cooler than (i.e., within) the first temperature by about 50%, 60%, 70%, or 80%.

Some embodiments may involve heating at least a portion of a substrate to a first temperature; placing the portion of the substrate in a heat containment apparatus according to any embodiment described herein; maintaining a first section of the portion of the substrate above a second temperature; performing a first high temperature operation on the first section of the portion of the substrate while the portion of the substrate is substantially within the heat containment apparatus; maintaining a second section of the portion of the substrate above a third temperature; and performing a second high temperature operation on the second section of the portion of the substrate while the portion of the substrate is substantially within the heat containment apparatus. In some embodiments, heating may occur in the heat containment apparatus. In some embodiments, the second temperature may be warmer or cooler than the first temperature by about 50%, 60%, 70%, or 80%. In some embodiments, the third temperature may be warmer or cooler than the second temperature by about 50%, 60%, 70%, or 80%. In some embodiments, the third temperature may be higher than the second temperature. In some embodiments, similar methods may extend to third, fourth, and so on high temperature operations.

Some embodiments may involve cooling at least a portion of a substrate to a first temperature; placing the portion of the substrate in a heat containment apparatus according to any embodiment described herein; maintaining a first section of the portion of the substrate below a second temperature; and performing a first low temperature operation on the first section of the portion of the substrate while the portion of the substrate is substantially within the heat containment apparatus. In some embodiments, cooling may occur in the heat containment apparatus. In some embodiments, the second temperature may be warmer or cooler than the first temperature by about 50%, 60%, 70%, or 80%.

Some embodiments may involve cooling at least a portion of a substrate to a first temperature; placing the portion of the substrate in a heat containment apparatus according to any embodiment described herein; maintaining a first section of the portion of the substrate below a second temperature; performing a first low temperature operation on the first section of the portion of the substrate while the portion of the substrate is substantially within the heat containment apparatus; maintaining a second section of the portion of the substrate below a third temperature; and performing a second low temperature operation on the second section of the portion of the substrate while the portion of the substrate is substantially within the heat containment apparatus. In some embodiments, cooling may occur in the heat containment apparatus. In some embodiments, the second temperature may be warmer or cooler than the first temperature by about 50%, 60%, 70%, or 80%. In some embodiments, the third temperature may be warmer or cooler than the second temperature by about 50%, 60%, 70%, or 80%. In some embodiments, the third temperature may be less than the second temperature. In some embodiments, similar methods may extend to third, fourth, and so on low temperature operations.

In some embodiments, sections (first, second, third, and so on) of the portion of the substrate may be the same section. In some embodiments, sections (first, second, third, and so on) of the portion of the substrate may overlap, substantially overlap, not overlap, or any combination thereof. By way of nonlimiting example, a substrate may be a rotary cone drill bit where a first section may be a cutting element, a second section may be a cutter, and a third section may be the area (or volume) at and near the interface between the cutting element and the cutter. By way of another nonlimiting example, a substrate may be a fixed cutter drill bit with a first section being the cutting elements and a second section being the surface of the fixed cutter drill bit excluding the threads.

In some embodiments, a heat containment apparatus may include a housing having an access gap, the housing being formed of an insulating material.

In other embodiments, a heat containment apparatus includes a housing being an expandable structure having an access gap, the housing including an insulating material.

In still other embodiments, the present invention provides a heat containment apparatus that includes a housing with a heating element, an insulating material, and an access gap.

In some embodiments, the present invention provides a heat containment apparatus that includes a housing with an insulating material, an access gap, and at least one selected from the group of a chimney, a removable access gap cover, a slideable access gap cover, a hinged access gap cover, a viewing window, a longitudinally expandable wall, a radially expandable wall, a hinged wall, a handle, a fluid port, a heating element, a fluid jacket, a reduced pressure container, a substrate holder, a base, or any combination thereof.

In other embodiments, the present invention provides a system that includes a heat containment apparatus with a housing having an access gap, the housing being formed of an insulating material; a substrate holder capable of maintaining a substrate within the heat containment apparatus; and a ventilation element in fluid communication with the heat containment apparatus.

In still other embodiments, the present invention provides a method that includes heating at least a portion of a substrate to a first temperature; placing the portion of the substrate in a heat containment apparatus that includes a housing having an access gap, the housing being formed of an insulating material; maintaining a first section of the portion of the substrate above a second temperature that is within about 50% of the first temperature; and performing a first high temperature operation on the first section of the portion of the substrate while the portion of the substrate is substantially within the heat containment apparatus.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
    heating at least a portion of a substrate to a first temperature;
    placing the portion of the substrate in a heat containment apparatus that comprises a housing having an access gap that comprises an opening extending from one end of the housing to another end along a longitudinal axis of the housing that allows a tool to access via the access gap the substrate disposed within the housing during a high temperature operation, the housing being formed of an insulating material;
    maintaining a first section of the portion of the substrate above a second temperature, different than the first temperature; and
    accessing the substrate with the tool via the access gap while performing brazing on the first section of the portion of the substrate with the tool while the portion of the substrate is substantially within the heat containment apparatus.

2. The method of claim 1 further comprising:
    maintaining a second section of the portion of the substrate above a third temperature that is within about 50% of the second temperature; and
    performing a second high temperature operation on the second section of the portion of the substrate while the portion of the substrate is substantially within the heat containment apparatus.

3. The method of claim 2, wherein the first section of the portion of the substrate and the second section of the portion of the substrate overlap.

4. The method of claim 1, wherein the heat containment apparatus further comprises a heating element, and wherein heating is performed in the heat containment apparatus.

5. The method of claim 1 further comprising:
    moving the substrate through the heat containment apparatus while performing the brazing.

6. The method of claim 1 wherein the tool is selected from the group consisting of a torch, a welder, a brazing torch, a hardfacing torch, a plasma torch, an aerosolizer, a sprayer, a grasping tool, a substrate manipulator, a cutter manipulator, a pliers, a tweezers, a screwdriver, a chisel, a tongs, a sand blasting tool, a grinding tool, a cutting tool, a wire feeder, a flux application tool, a flux gun, a scoop, a gas nozzle, a liquid nozzle, a liquid dispenser, a suction device, a extraction device, a guide, a lifting device, a robotic fixture, a robotic arm, and any combination thereof.

7. The method of claim 1, wherein the first temperature is about 480° C. to about 705° C. and the second temperature is about 650° C. to about 760° C.

8. The method of claim 1, wherein the second temperature is within about 50% of the first temperature.

9. A method comprising:
    heating at least a portion of a substrate to a first temperature;
    placing the substrate in a heat containment apparatus that comprises a housing having an access gap that comprises an opening extending from one end of the housing to another end along a longitudinal axis of the housing that allows a brazing torch to access via the access gap the substrate disposed within the housing during a high temperature operation, the housing being formed of an insulating material;
    maintaining a first section of the portion of the substrate above a second temperature, different than the first temperature; and
    disposing a portion of the brazing torch from outside the heat containment apparatus through the access gap to access the substrate while performing brazing on a first section of the substrate with the brazing torch while the substrate is substantially within the heat containment apparatus.

10. The method of claim 9, wherein the heat containment apparatus further comprises a heating element, and wherein heating is performed in the heat containment apparatus.

11. The method of claim 9, further comprising:
    moving the substrate through the heat containment apparatus while performing the brazing.

* * * * *